(12) United States Patent
Eusterbarkey (10) Patent No.: US 8,167,575 B2
(45) Date of Patent: May 1, 2012

(54) CONNECTION OF COMPONENTS OF A WIND TURBINE

(75) Inventor: Carsten Eusterbarkey, Simonsberg (DE)

(73) Assignee: Repower Systems AG, Hamburg (DE)

( * ) Notice: Subject to any disclaimer, the term of this patent is extended or adjusted under 35 U.S.C. 154(b) by 988 days.

(21) Appl. No.: 12/055,005

(22) Filed: Mar. 25, 2008

(65) Prior Publication Data

US 2008/0240922 A1    Oct. 2, 2008

(30) Foreign Application Priority Data

Mar. 26, 2007   (DE) .................... 10 2007 014 860

(51) Int. Cl.
*F04D 29/044* (2006.01)
(52) U.S. Cl. ...................... 416/244 R; 416/248; 403/335
(58) Field of Classification Search ................. 416/174, 416/204 R, 239, 244 R, 248, 134 R, 155; 415/173.1, 174.3; 428/408; 403/335–337, 403/183, 29, 30, 1, 2, 26, 46, 68, 179
See application file for complete search history.

(56) References Cited

U.S. PATENT DOCUMENTS

| | | | | |
|---|---|---|---|---|
| 1,523,296 A | | 1/1925 | Ryan | |
| 2,617,672 A | * | 11/1952 | Nichols | 403/183 |
| 2,879,092 A | * | 3/1959 | Grobel et al. | 403/337 |
| 3,656,785 A | * | 4/1972 | Lothar | 403/370 |
| 4,168,089 A | * | 9/1979 | Hulslander et al. | 285/197 |
| 4,822,204 A | * | 4/1989 | Lindenthal | 403/337 |
| 6,066,063 A | * | 5/2000 | Ishikawa | 475/234 |
| 6,367,439 B1 | * | 4/2002 | Nishioka et al. | 123/90.51 |
| 6,413,052 B1 | * | 7/2002 | Corley | 416/244 R |
| 6,899,488 B2 | * | 5/2005 | Geringer et al. | 403/337 |
| 2005/0118364 A1 | * | 6/2005 | Guise et al. | 428/34.1 |
| 2005/0196280 A1 | * | 9/2005 | Gonzalez et al. | 416/131 |
| 2006/0055174 A1 | | 3/2006 | Landwehr | |
| 2006/0275120 A1 | * | 12/2006 | Parsons et al. | 416/114 |

FOREIGN PATENT DOCUMENTS

| | | |
|---|---|---|
| DE | 86 25 580 U1 | 11/1986 |
| DE | 8625580 U1 | 11/1986 |
| DE | 19510182 | 1/1996 |
| DE | 691 14 016 T2 | 4/1996 |
| DE | 69114016 | 4/1996 |
| DE | 197 33 372 C1 | 1/1999 |
| DE | 198 32 921 A1 | 2/2000 |
| DE | 10011464 | 8/2001 |
| DE | 101 19 427 A1 | 10/2002 |
| DE | 10119427 | 10/2002 |
| DE | 101 52 018 A1 | 4/2003 |
| EP | 1302685 | 4/2003 |
| WO | 0036724 | 6/2000 |

* cited by examiner

*Primary Examiner* — Edward Look
*Assistant Examiner* — Christopher R Legendre
(74) *Attorney, Agent, or Firm* — Rankin, Hill & Clark LLP (57) ABSTRACT

The invention relates to a connection between components of a wind turbine. More specifically, the present invention relates to components for a wind turbine having a diameter of more than 0.5 m, preferably more than 1.0 m, and more preferably more than 1.5 m. The wind turbine includes two components that are connected together, whereby each component has a contact surface. The surface of the contact surface of a first component is softer than the surface of the contact surface of a second component. Further, the surface of the contact surface of the second component is annealed.

16 Claims, 6 Drawing Sheets

CONNECTION OF COMPONENTS OF A WIND TURBINE

BACKGROUND OF THE INVENTION

The present invention relates to components for a wind turbine. More specifically, the present invention relates to a connection between components for a wind turbine having a diameter of more than 0.5 m, wherein the components each have a contact surface.

In order to connect large-volume components of a wind turbine during installation, maintenance, or repair, flange connections or screw connections are provided between components, such as between a rotor shaft and a drive input or between the rotor shaft and a rotor hub.

In addition, screw connections are provided between the connection of a tubular tower and a pivot bearing or between a machine support and other components such as a rotor mount, a gearbox mounting, an axle journal, or a (ring) generator.

Based on this state of the art, the object of the invention is to improve the connection between large-volume components of a wind turbine, where it should be possible to increase the load bearing capacity of highly stressed screw connections or the like.

BRIEF SUMMARY OF THE INVENTION

The object is solved by providing a connection between components of a wind turbine having a diameter of more than 0.5 m, preferably more than 1.0 m, and more preferably more than 1.5 m, wherein two components to be connected together each have facing contact surfaces and the two components are or become braced together in a connected state, wherein a surface of the contact surface of a first component of the wind turbine is softer than a surface of the contact surface of a second component of the wind turbine, and wherein the surface of the contact surface of the second component is annealed.

Due to the fact that the surface of the contact surface of the second component is harder than the surface of the contact surface of the first component, a detachable connection of mechanically highly stressed components of a wind turbine are achieved, which has higher friction coefficients than the previously known connections of components of a wind turbine.

Through corresponding connection elements, screws or the like, a preloading is created or formed between the components such that a force-fit connection is achieved between the components. A friction-coefficient-increased coupling of the components is thereby achieved between the two components through the preloading applied via the connection elements based on a micro-plastic deformation of the contact surfaces created during the joining procedure, whereby higher friction coefficients of the connection are achieved.

This is especially important in the use or installation of wind turbines because the wind turbine is either installed or repaired under very unfavorable installation and repair conditions. Through the connection according to the invention, it is possible to connect extremely heavy, partially dirty or oiled components at heights of up to 120 m in unfavorable weather conditions, such as snow, ice or rain, with a mechanically highly stressed connection between the components, wherein the load-bearing capacity of the components of the connection is or will be increased simultaneously through the formation of a friction-coefficient-increased connection between the contact surfaces.

Within the framework of the present invention, the characteristic "annealed" or "harder surface" of a component means that a component made of a normalized substance, e.g. heat-treatable steel, is produced with an existing harder surface through production and that a finished component in processing steps in accordance with a preferred annealing process is provided with a harder surface.

Within the framework of the present invention, a connection is understood to be a flange connection of components. Furthermore, in the framework of the present invention, a component is understood to be a functional group or system group or a functional unit or system unit of a wind turbine, e.g. a rotor hub, a rotor shaft, a gear, which is or becomes mechanically coupled with another functional/system group or functional/system unit of the system via the connection according to the invention, in particular a screw connection or flange connection. The components or functional units or system units are in particular large-volume components with weights of more than 100 kg up to several tons.

Moreover, the connection is characterized in that the surface of the contact surface of the second component has a higher roughness than the surface of the contact surface of the first component. The micro-plastic deformation in the soft surface of the contact surfaces of the first component is hereby improved. Overall, this increases the frictional connection of the components of a wind turbine that are to be connected.

In particular, the connection is further characterized in that the frictional connection between the first and the second component is or becomes increased in comparison to a connection of the first and second component where the second component does not have an annealed surface. A detachable connection with high friction coefficients is thereby achieved between the contact surfaces of the components to be connected. Further, in the event that maintenance is performed on the wind turbine or on the components of the wind turbine, the detached connection between the components after dismantling ensures a connection between the components subsequently during reinstallation with a high frictional connection.

Moreover, it is provided in a further embodiment that the second component is or will be arranged as an intermediate connection part or an intermediate connection component between the first component and a third component. This enables a force-fit connection between the first and the third components with a second component arranged in between.

It is furthermore provided that the surfaces of the contact surfaces of the second component each have a higher hardness and roughness than the surfaces of the contact surfaces of the first and third component lying opposite the contact surfaces of the second component.

In particular, it is thereby possible that the frictional connection between the third and the second component is or becomes increased in comparison to a connection of the third and second component where the second component does not have an annealed surface.

Preferably, the first and the second component are connected with each other by means of a flange connection. Alternatively, the first and the third component are also connected with each other by means of a flange connection.

Advantageously, the first and the second component are or become preloaded by connection elements, preferably screws or the like, e.g. bolts, so that a force-fit connection is formed between the first and the second component of a wind turbine. Alternatively, the first and the third component are or become preloaded through connection elements, preferably screws, bolts or the like.

Moreover, it is suggested in a further embodiment that the intermediate connection part or component, which is or will be arranged as the second component between the first and the third component, is or will be penetrated by the connection elements.

It is hereby preferred if the intermediate connection part or component is made up of or has several in particular plate-like or block-like intermediate connection bodies. For this, it is further provided in one embodiment that the intermediate connection bodies form a type of segmented ring, in particular a segmented annular ring or parts thereof for or through arrangement between the first and the third component.

Preferably, the intermediate connection bodies are or will be connected with the first and/or the second component mechanically by means of mounting elements, in particular screws or pins or clamps or the like.

In accordance with another embodiment, the contact surfaces of the first and/or the second component and/or the third component are designed or arranged in a ringlike and/or closed manner.

Moreover, it is preferred that the connection or the frictional connection between the components has a friction coefficient of more than 0.4, preferably more than 0.5, and in particular more than 0.6.

In particular, the first component is designed as a rotor shaft.

Furthermore, it is provided that the second component is designed as a rotor hub or as a gear input shaft. If the connection consists of a rotor shaft (first component) and a rotor hub (third component) and an intermediate connection part (second component) is arranged between the first and the third component, a three-part connection is hereby provided. The third component is hereby designed as a rotor hub or as a gear input shaft.

In one alternative, the first component is designed as a machine frame or a tubular tower. For this, it is further provided that the second or the third component is designed as a pivot bearing, which is or will be arranged on the tubular tower.

Advantageously, the connection is designed as a force-fit, in particular detachable, connection, in particular transverse-force-loaded and/or torsion-loaded connection or screw connection.

Preferably, the first or second or third component is a casting component, preferably with (connection) diameters of 0.5 m to 1 m.

Moreover, the object is solved through the use or the arrangement of components in the case of at least one connection described above of two or three components of a wind turbine. A two-part or three-part connection is hereby designed. In order to avoid repetitions, we expressly refer to the above embodiments.

The object is also solved by means of a method for producing a connection of components of a wind turbine, wherein a connection is designed according to one of the above exemplary embodiments.

The object is also solved by a wind turbine, which is designed with a connection described above.

The invention is described below in an exemplary manner, without restricting the general intent of the invention, based on exemplary embodiments in reference to the drawings, whereby we expressly refer to the drawings with regard to the disclosure of all details according to the invention that are not explained in greater detail in the text.

Additional benefits and advantages of the present invention become apparent to those skilled in the art to which it pertains upon a reading and understanding of the following detailed specification.

The invention may take physical form in certain parts and arrangement of parts, a preferred embodiment of which will be described in detail in this specification and illustrated in the accompanying drawings that form part of the specification.

DETAILED DESCRIPTION OF THE INVENTION

In the following figures, for simplicity the same or similar types of elements or corresponding parts are provided with the same reference numbers.

Figure 1:
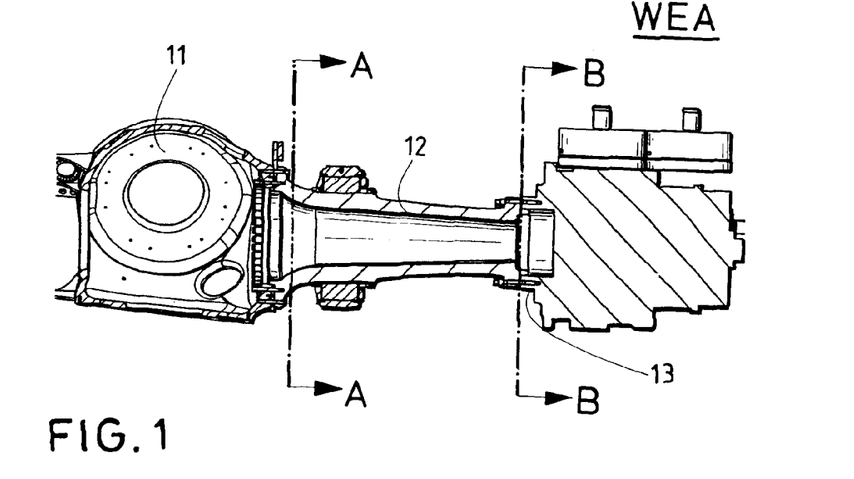
FIG. 1 shows the cross-section of the connection of a rotor shaft with a rotor hub and a section of the gear.

FIG. 1 shows a cross-section of a connected arrangement of a rotor hub 11 with a rotor shaft 12 and a connection part 13 of a corresponding gear of a wind turbine. The rotor hub 11, the rotor shaft 12 and the gear (not shown), which has the connection part 13 in the front area, are parts of a schematically indicated wind turbine WEA.

Figure 2:
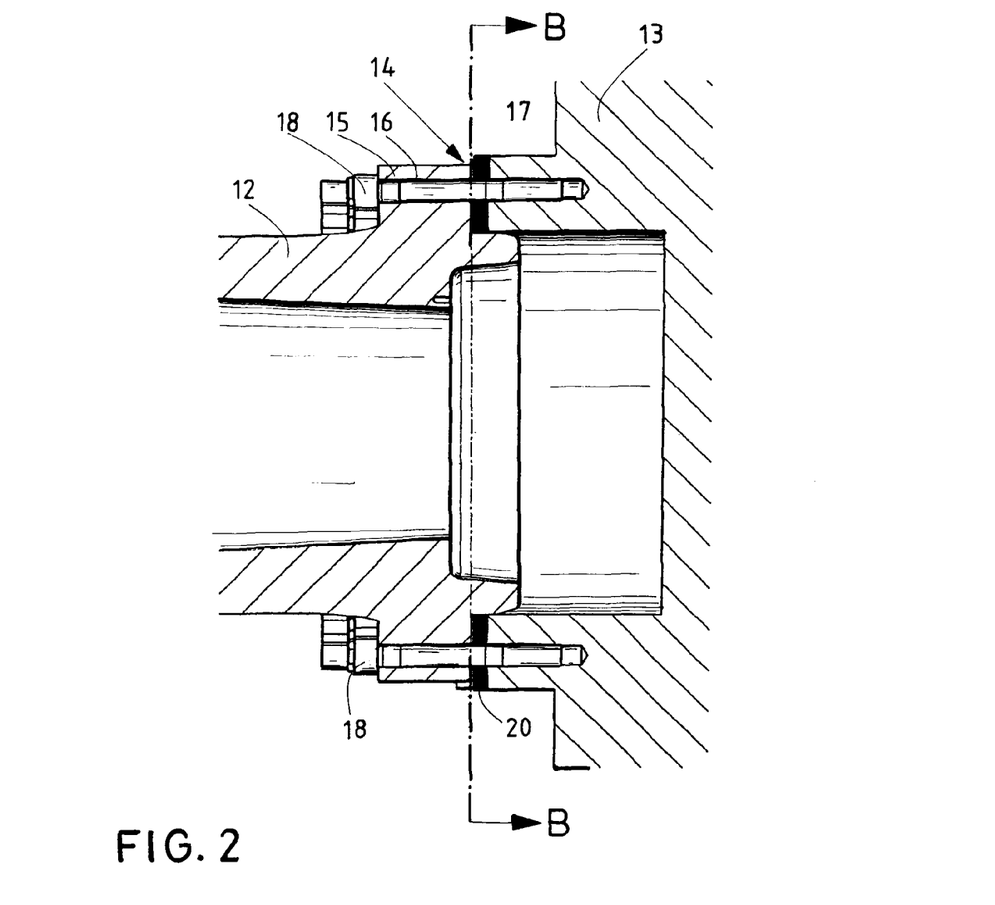
FIG. 2 shows a detailed view of the connection transition of the rotor shaft with the gear.

As shown in FIG. 2, the rotor shaft 12 is connected with the connection part 13 of the gear by means of a flange connection 14. For this, the rotor shaft 12 has a flange ring 15 on the end facing the connection part 13, which has corresponding bore holes 16 for receiving screws. The bore holes 16 are arranged at regular intervals around the perimeter of the flange ring 15. The connection part 13 of the gear has corresponding tapped blind holes 17 on the side facing the rotor shaft 12, which have corresponding threads. From the rotor shaft side, screws 18 with thread are inserted into the bore holes 16 of the rotor shaft 12 and the bore holes 17 of the connection part 13 so that the rotor shaft 12 is connected with the connection part 13 under the formation of preloading.

Intermediate connection bodies 20, which are located in a detachable manner between the rotor shaft 12 and the connection part 13, are arranged between the end of the rotor shaft 12 and the end of the connection part 13, which is arranged opposite the rotor shaft 12, in the area of the bore holes 16, 17. In accordance with the invention, the intermediate connection bodies 20 are provided with a harder contact surface than the contact surfaces of the rotor shaft 12 and the connection part 13 on both sides of the rotor shaft 12 and the connection part 13, such that the friction coefficient and the frictional connection between the rotor shaft 12 and the connection part 13 are or will be increased by pulling the screws 18.

In the case of dismantling, i.e. loosening the connection between the rotor shaft 12 and the connection part 13 by unscrewing the screws 18, it is possible that the intermediate connection bodies 20 on the detachable connection between the two components can be manually removed. The contact surfaces of the rotor shaft 12 and the connection part 13, which lie opposite each other, are preferably smooth. Typically, the ends of the rotor shaft 12 and the connection part 13 are greater than 0.5 m in diameter.

Alternatively, the connection of the rotor shaft 12 to the connection part 13 can also be established without intermediate connection bodies. This is available in particular when the connection part 13 is designed as a forged planet carrier with an annealed contact surface. The shaft can then be poured e.g. from EN-GJS 400. Alternatively, the shaft can also be annealed, in particular if it is designed as a forged part.

Figure 3A:
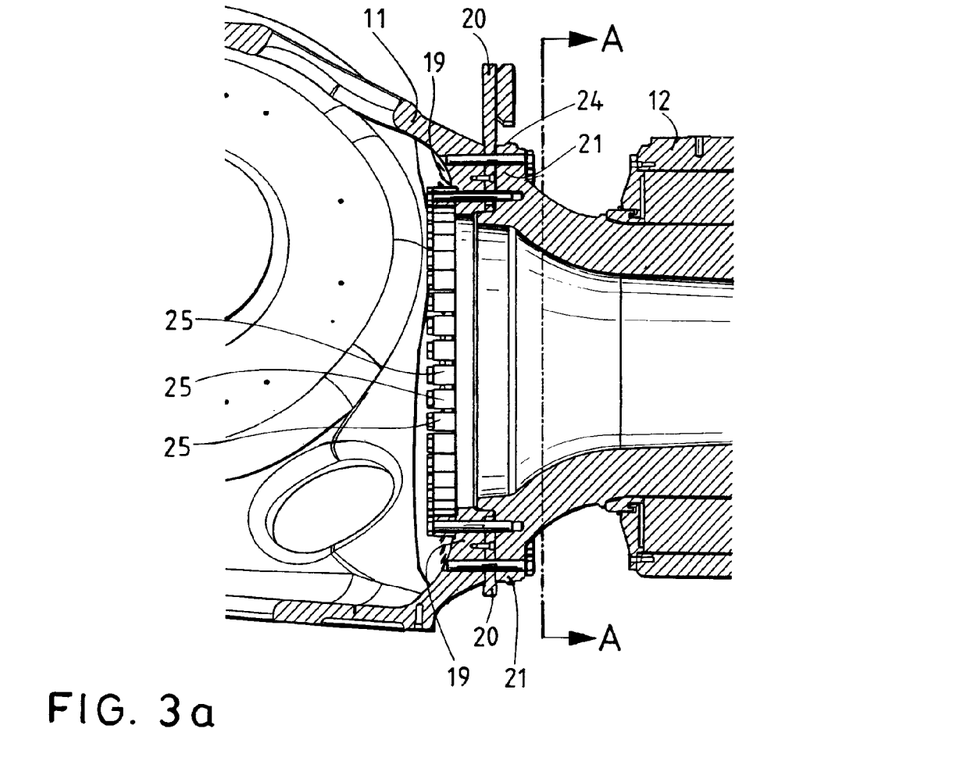
FIG. 3a shows the flange connection of the rotor hub with the rotor shaft in a detailed view.

FIG. 3a also shows a detailed view of a cross-section of the connection between the rotor shaft 12 and the rotor hub 11 (see FIG. 1). For this, the rotor hub 11 has a flange ring 19 on the inside with corresponding bore holes, into which bolts or screws can be inserted and connected with the front side of the rotor shaft 12. For this, corresponding tapped blind holes are provided on the rotor shaft 12 for receiving the screws or bolts.

The screws or bolts are inserted from the inside of the rotor hub 11 and connected with the rotor shaft 12. Furthermore, in order to form an alternating flange connection on the rotor shaft 12, a flange ring 21 with corresponding bore holes are provided for receiving bolts or screws. The bolts are hereby inserted into the bore holes of the flange ring 21 from the side facing away from the rotor hub 11 such that the bolts or screws penetrate correspondingly formed (tapped blind holes or through) holes on the rotor shaft 11, whereby the bolts of the outer row of the flange ring 21 are arranged against the bolts of the inner row of the flange ring 19 of the rotor shaft 11. The hole circle of the bore holes of the flange ring 21 is hereby greater than the hole circle of the bore holes of the flange ring 19.

Overall, this enables a double-row screw flange connection of the two mechanically highly stressed components, wherein the assembly takes place in that the rotor hub and the rotor shaft are aligned with each other, then the screw connection of the row of bolts on the outer lying flange ring 21 of the rotor shaft 12 takes place and then the connection elements in the form of bolts or screws are screwed in the inside of the rotor hub 11 on the inner lying flange ring 19. Then the bolts or screws are preloaded with a predetermined preload force. This enables a robust flange connection of the rotor hub 11 with the rotor shaft 12.

Due to casings 25 under the screw heads of the inner screw row, it is possible to use uniform screw lengths for the purpose of standardization. A track 24, which functions as a contact track for a lightening arrestor (not shown), is arranged on the outer flange ring 21.

In order to form a friction-value-increased connection between the rotor hub and the rotor shaft, intermediate connection components 20 are provided in the form of a locking disk. The surfaces of the contact surfaces to rotor hub 11 and rotor shaft 12 are designed harder than the contact surfaces of rotor hub 11 and rotor shaft 12 so that the frictional connection in the case of the preloading of the bolt row on the flange rings 19, 21 leads to a better friction coefficient. Alternatively, the flange connection can also be designed without intermediate connection components 20 in that the surface of the contact surface of the rotor shaft 12 is designed harder than the contact surface of the rotor hub 11. This is offered in particular when the rotor hub 11 is designed as a casting component and the rotor shaft 12 is designed as a forged component made of heat-treatable steel.

Through the connection according to the invention of large-volume components of a wind turbine with or without intermediate connection components with harder surfaces on both sides of the components to be connected, rotor hub 11 and rotor shaft 12, an arrangement is achieved for preventing relative movements between the components (rotor hub 11 and rotor shaft 12) that are braced against each other and work together in a frictionally engaged manner.

In particular, the rotor hub 11 is a component made of a cast material, e.g. nodular graphite casting, or made of simple structural steel, wherein the contact surface of the flange ring 19 for the rotor shaft is preferably processed to be mechanically smooth, e.g. RZ 16.

Moreover, the rotor shaft 12 is designed as a second component as a steel component (structural steel or heat-treatable steel) or as a casting component with a harder surface of the contact surface than the contact surface of the rotor hub 11. Preferably, the surface of the contact surface is sand-blasted with a sharp-edged shot, e.g. sand-blasted with SA 3 quality, and then annealed through e.g. thermo-physical methods (e.g. flame annealing or induction annealing) or through thermo-chemical methods (e.g. long-term gas-nitro carborizing). For example, a hardness of at least 400 HV (Vickers hardness), preferably greater than 550 HV, is hereby achieved. The density of the hardness layer should be approx. 0.6 mm or greater.

The preloading applied by the connection elements or bolts between the rotor shaft 12 and the rotor hub 11 should achieve surface pressures on the contact surfaces in the range of 60 to 220 N/mm$^2$, preferably between 90 and 200 N/mm$^2$. Friction coefficients of the connection from the rotor shaft with the rotor hub above 0.4, preferably above 0.5, are hereby implemented in a very cost-efficient and reliable manner.

Figure 3B:
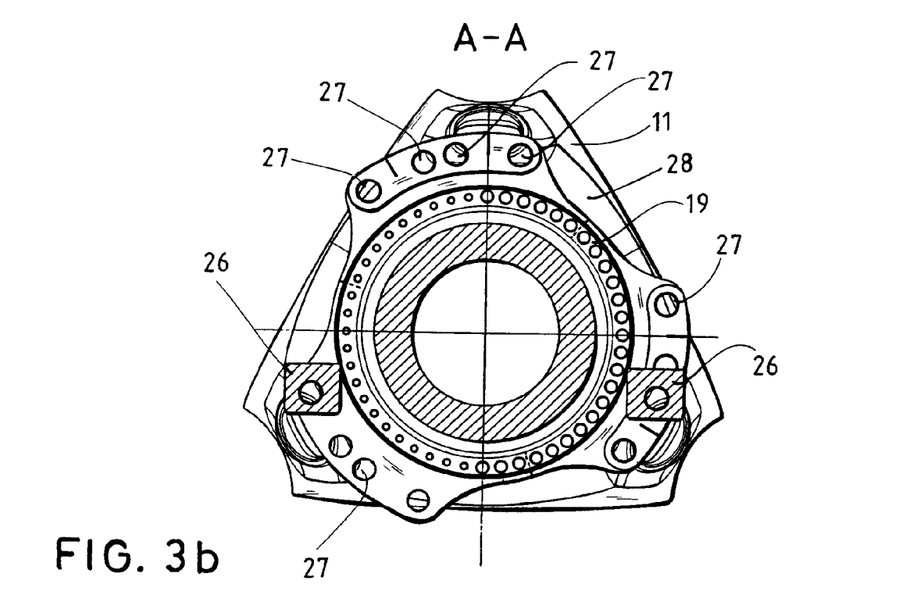
FIG. 3b shows the view of a flange connection of the rotor hub with a cut rotor shaft.
Figure 4A:
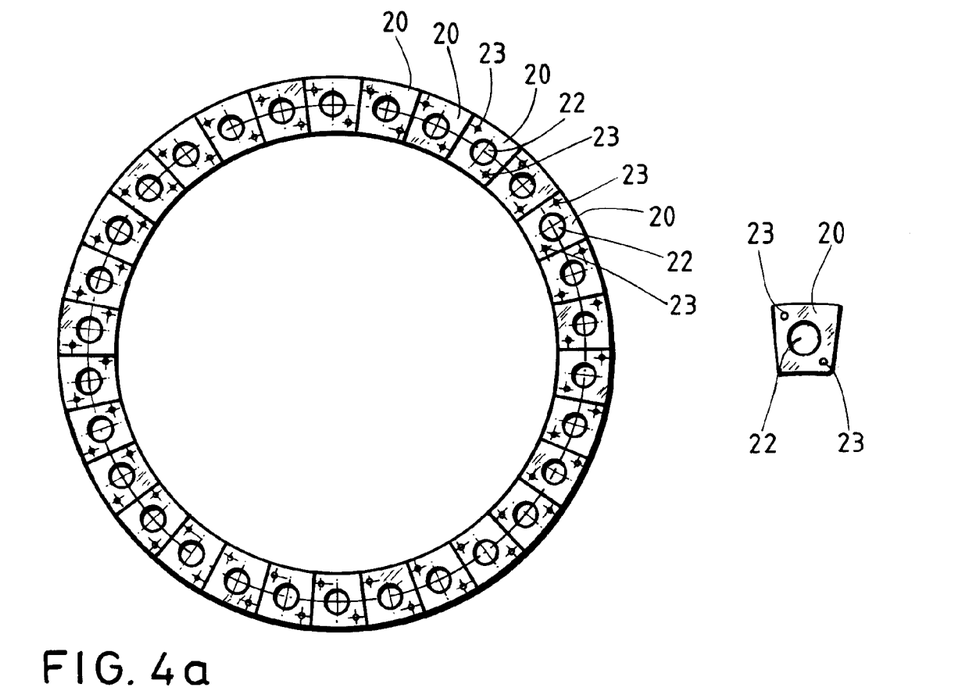
FIG. 4a-4d show views of circular segment intermediate bodies in view representations and FIG. 5 shows a detailed view of the connection transition of the rotor shaft with the gear in accordance with another embodiment.
Figure 4B:
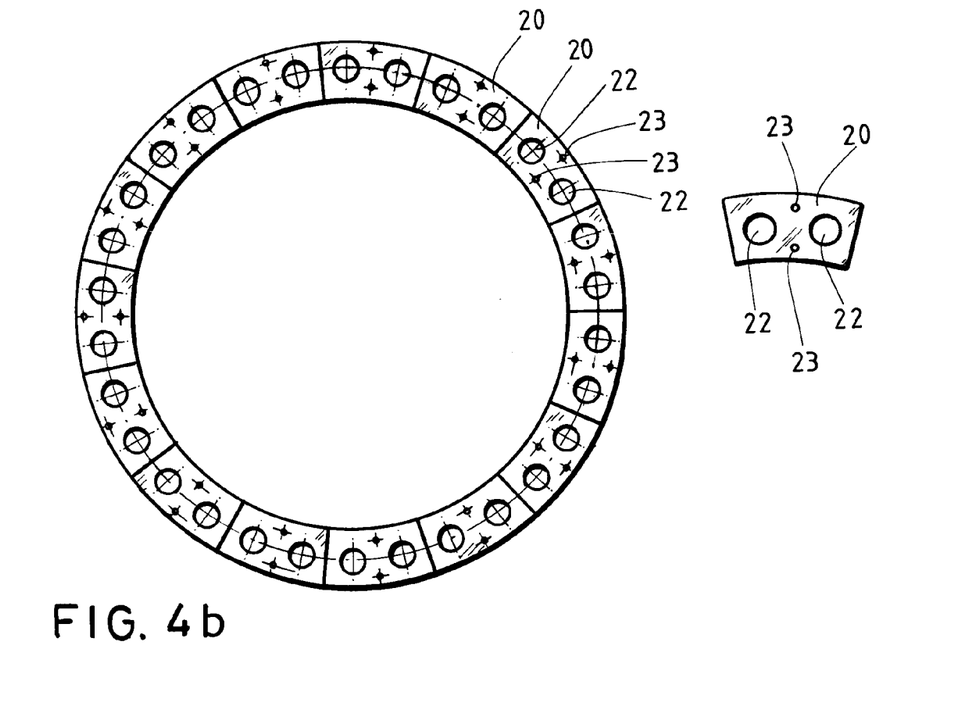
Figure 4C:
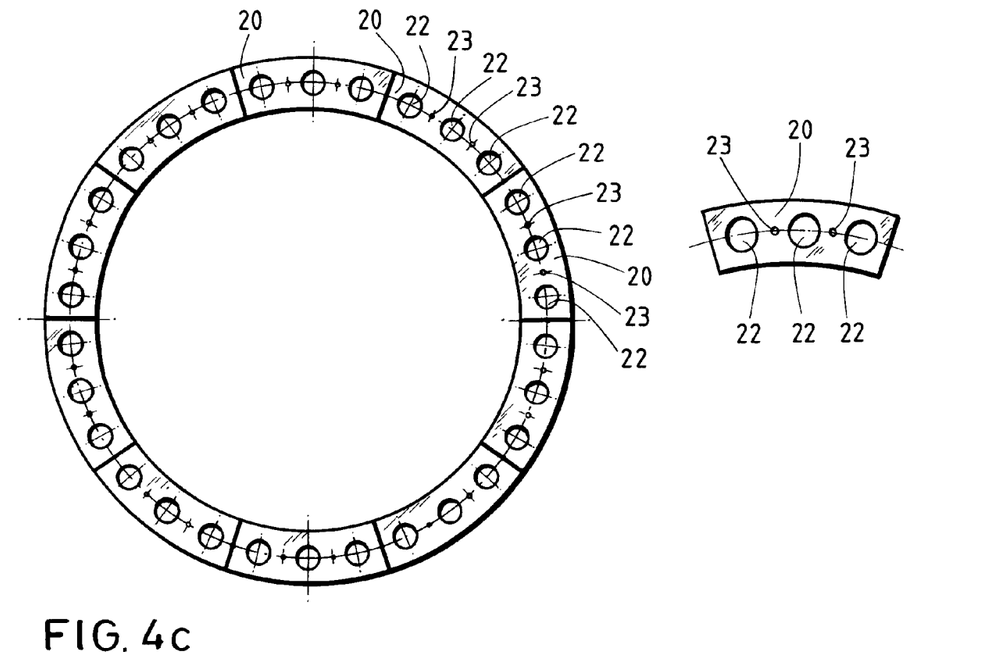
Figure 4D:
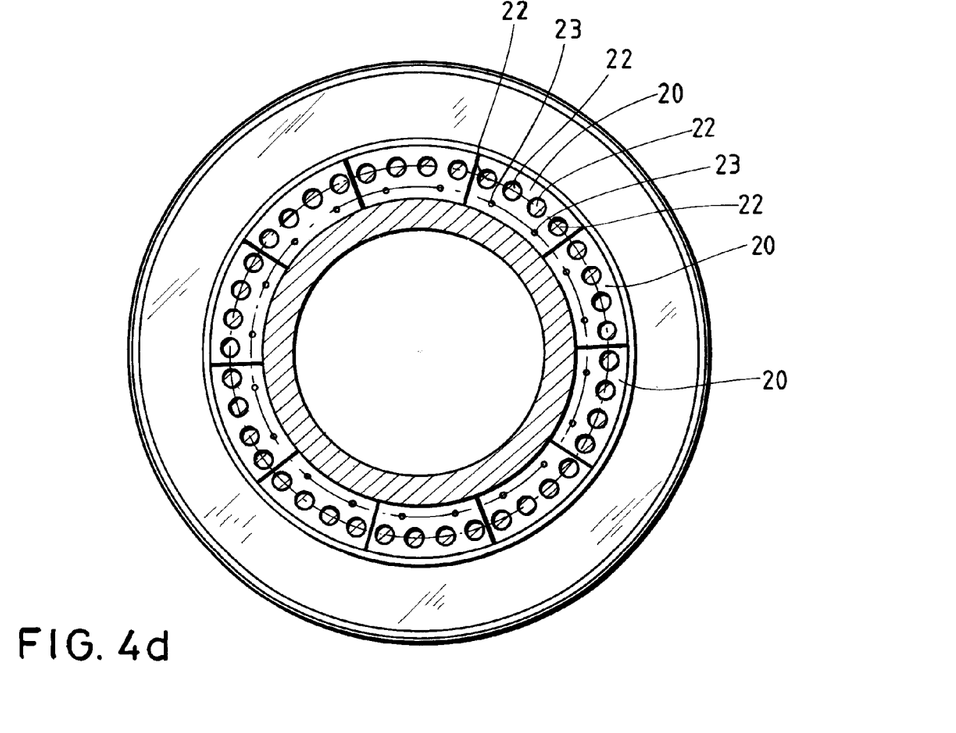

Furthermore, FIG. 3b shows a view of the flange ring 19 of the rotor hub 11. It can be seen from this that the bore holes of the flange ring 19 are arranged in a circular manner, wherein the connection area of the rotor hub 11 to the rotor shaft on the flange ring 19 has a diameter of more than 0.5 m overall.

FIGS. 3a and 3b also show that the intermediate connection bodies 20 can simultaneously be used as a locking disk for a rotor lock. The locking disk is made up of three identical segments, which are designed as intermediate connection bodies 20. The locking takes place via two locking devices 26, in which bolts (not shown) are pushed through the bolt receivers 27. A total of 12 bolt receivers 27 are positioned such that each rotor blade is lockable in a vertical and horizontal position. The three recesses 28 in the locking disk make it possible for maintenance personnel to climb into the rotor hub casing. It is particularly economical when the locking disk is made of remaining pieces of the machine frame production.

The rotor hub casing (not shown) is preferably fastened to the intermediate elements 20 in order to not interrupt the flow of power in the rotor hub through additional fastenings (gatings).

FIGS. 4a through 4d show one view different embodiments of the arrangement of intermediate connection bodies 20 of a component or a flange of a component. The left area of FIGS. 4a through 4c each show a circular arrangement of the intermediate connection bodies 20 and the right area of the figures each show a single view of the intermediate connection bodies 20.

By means of the contact surfaces of the intermediate connection bodies 20 between the contact surfaces of two components which are harder on one side, preferably harder on both sides, of the contact surfaces of components, in particular the contact surfaces of a flange connection between the components, a type of segmented ring is formed from the intermediate connection bodies 20. The intermediate connection bodies 20 are designed as a partial segment of a circular arrangement.

The intermediate connection bodies 20 can have one or more through holes 22, so that the intermediate connection bodies 20 are penetrated by bolts or screws of a flange connection between two components to be connected. Moreover, the intermediate connection bodies 20 have smaller bore holes 23 so that mounting elements in the form of countersunk screws penetrate the bore holes 23, whereby for example the mounting of the intermediate connection bodies 20 on a flange ring is enabled or simplified.

The intermediate connection bodies 20 can hereby be mounted on the contact surfaces of the components through the insertion of screws or other mounting elements into the bore holes, wherein the contact surfaces preferably have corresponding tapped blind holes for receiving threads.

Within the framework of the invention, it is also possible that on the intermediate connection bodies 20 corresponding immobilization devices or positioning devices for the immobilization or arrangement of the intermediate connection bodies 20 are provided on a component or on a flange of a component.

Due to the fact that a second component (FIG. 2) is provided between a first and a third component (11, 13), which has a higher hardness on its contact surfaces to the first and the third component (11, 13), the second hard component (20) can be designed in a plate-like manner or like a sort of intermediate element or intermediate connection part with intermediate connection bodies. This minimizes the costs for an annealing of the surfaces of the first and third components (11, 13). Depending on the annealing method, it is hereby advantageous to restrict the size of the intermediate connection bodies through segmentation. In particular in the case of ring flange connections, the intermediate connection bodies are preferably designed as annular ring elements.

Figure 5:
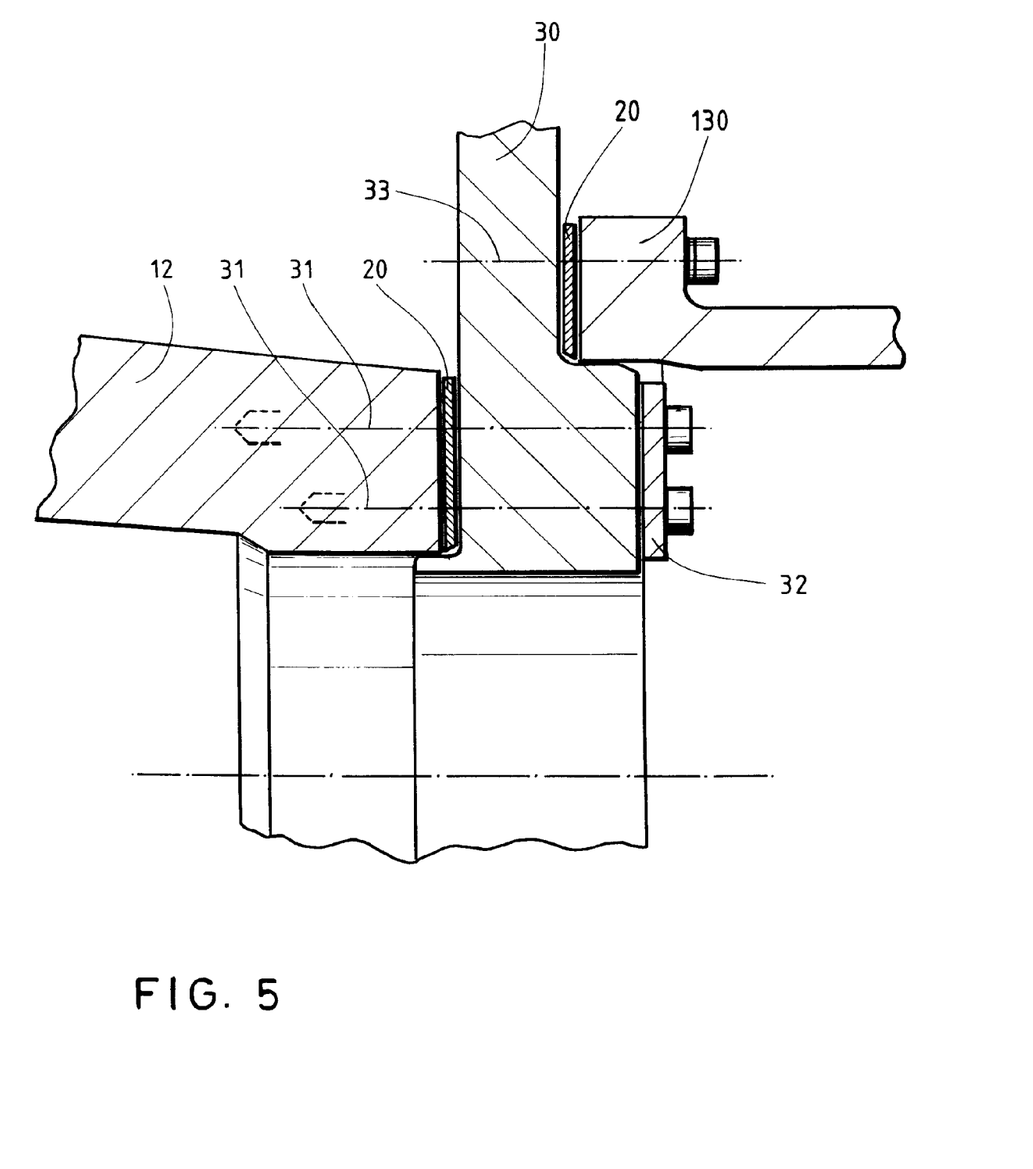

FIG. 5 shows another exemplary embodiment of a connection of a rotor shaft 12 with a gear flange 130 of a gear (not shown further) according to the embodiment shown in FIG. 2. A locking disk 30 is hereby arranged between the rotor shaft 13 and the gear flange 130, which has both contact surfaces to the rotor shaft 12 and the gear flange 130.

In order to improve the stability of the connection between the rotor shaft 12 and the locking disk 30 or between the rotor shaft 12 and the drive flange 130, intermediate connection bodies 20, which are provided with a coating on the surface, are arranged between the rotor shaft 12 and the locking disk 130. Furthermore, the locking disk 30 is provided with through holes, so that schematically indicated screws 31, which are inserted on the gear flange side, a washer 32, the locking disk 30 and the provided through holes of the intermediate connection bodies 20 penetrate and empty into tapped blind holes of the rotor shaft 12. The washer 32 ensures better load distribution.

Furthermore, intermediate connection bodies 20 are arranged between the locking disk 30 and the gear flange 130 so that the gear flange 130 and the locking disk 30 are connected with schematically indicated screws 33. The intermediate connection bodies 20 are annealed and/or coated intermediate connection bodies 20 according to the invention such that improved force-fit connections with higher frictional connections result.

The embodiment shown in FIG. 5 is the multiple combination or a series connection of several connections according to the invention.

Figure 6:
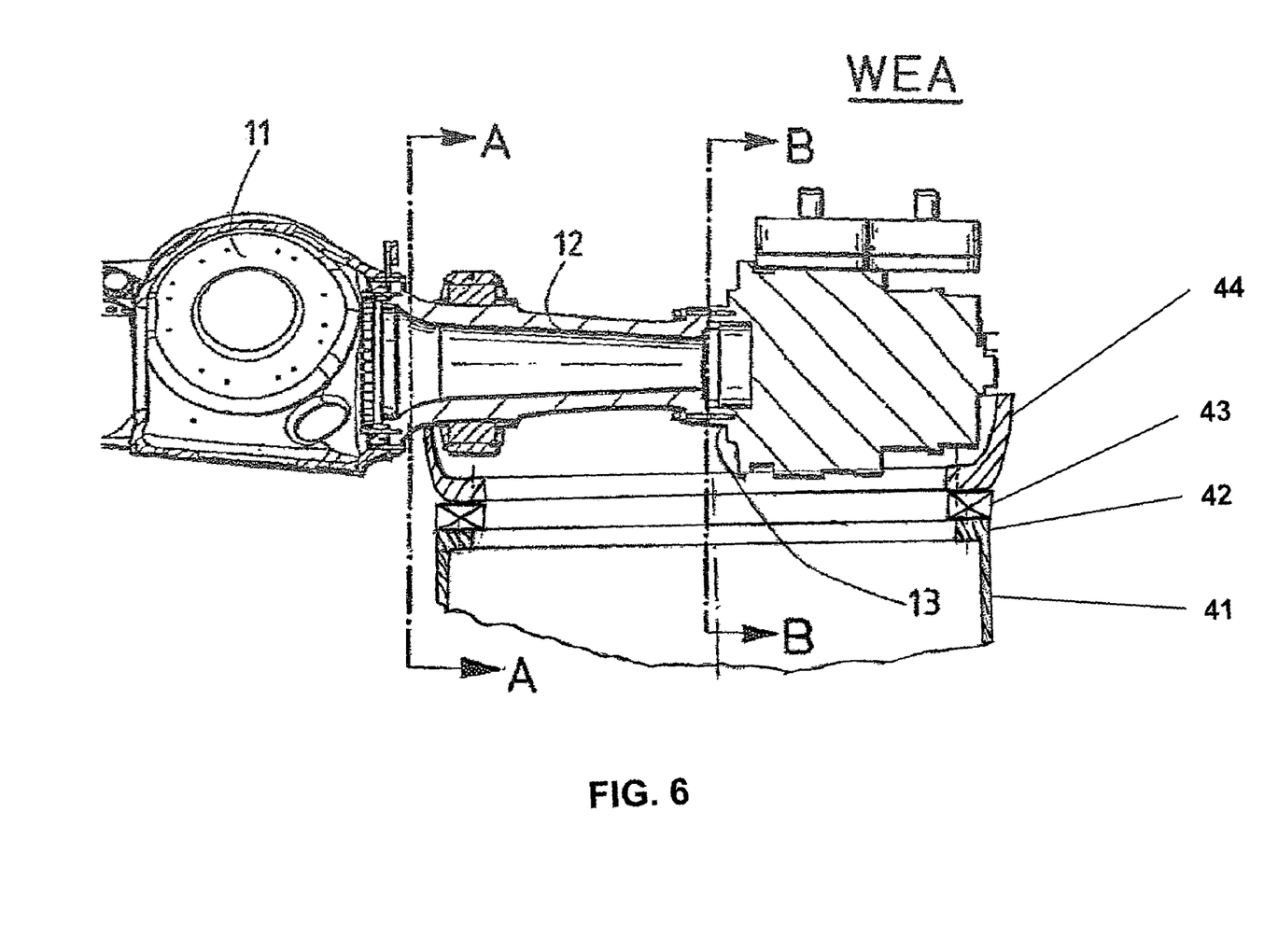
FIG. 6 shows the cross-section of the connection of a rotor shaft with a rotor hub and a section of the gear, and in addition a connection of a machine frame and tubular tower.

Referring to FIG. 6, in one alternative, a first component to be connected is designed as a machine frame 44 or a tubular tower 41. For this, it is further provided that a second or a third component used in a connection is designed as a pivot bearing 43, which is or will be arranged on the tubular tower 41, which includes a connecting flange 42.

While specific embodiments of the invention have been described and illustrated, it is to be understood that these embodiments are provided by way of example only and that the invention is not to be construed as being limited but only by proper scope of the following claims.

The invention claimed is:

1. A connection between components of a wind turbine having a diameter of more than 0.5 m comprising:
    a first component having a contact surface;
    a second component having a first contact surface and a second contact surface;
    a third component having a contact surface,
    wherein a surface of the contact surface of the first component is softer than a surface of the first contact surface of the second component,
    wherein the contact surface of the first component and the first contact surface of the second component face each other and the first and second component are braced together in a connected state while the third component contact surface has a surface facing toward said second contact surface of the second component,
    wherein the second component is an intermediate connection part between the first component and the third component and the surfaces of the first and second contact surfaces of the second component are annealed; and,
    surfaces of the first and second contact surfaces of the second component each have a higher hardness than the surfaces of the contact surfaces of the first and the third component lying opposite the contact surfaces of the second component.

2. The connection of claim 1, wherein the surfaces of the first and second contact surfaces of the second component each have a higher roughness than the surfaces of the contact surfaces of the first and the third component lying opposite the contact surfaces of the second component.

3. The connection of claim 1, wherein the first component and the third component are connected together by a flange connection.

4. The connection of claim 3, wherein the first and third components are preloaded through connection elements.

5. The connection of claim 4, wherein the intermediate connection part is penetrated by the connection elements.

6. The connection of claim 1, wherein the intermediate connection part comprises plural intermediate connection bodies.

7. The connection of claim 6, wherein the intermediate connection bodies form a segmented ring arranged between the first and the third components.

8. The connection of claim 7, wherein the intermediate connection bodies are connected with at least one of the first and third components mechanically by mounting elements.

9. The connection of claim 1, wherein the contact surfaces of at least one of the first, second, and third components are designed or arranged in a ring-shaped manner.

10. The connection of claim 1, wherein a friction coefficient between the first and second contact surfaces of the second component and the contact surfaces of the first and third components is more than 0.4.

11. The connection of claim 1, wherein the first component is a rotor shaft of the wind turbine.

12. The connection of claim 11, wherein the second component is a rotor hub or a gear input shaft of the wind turbine and the third component is a rotor hub or a gear input shaft of the wind turbine.

13. The connection of claim 1, wherein the first component is a machine frame or tubular tower of the wind turbine.

14. The connection of claim 13, wherein one of the second and third components is a pivot bearing arranged on the tubular tower.

15. The connection of claim 1, wherein a connection between the first and second components is detachable force fit connection.

16. The connection of claim 1, wherein at least one of the first, second, and third components is a casting.

* * * * *